Jan. 14, 1936.  F. J. LAPOINTE  2,027,486
CLUTCH
Original Filed Feb. 21, 1931
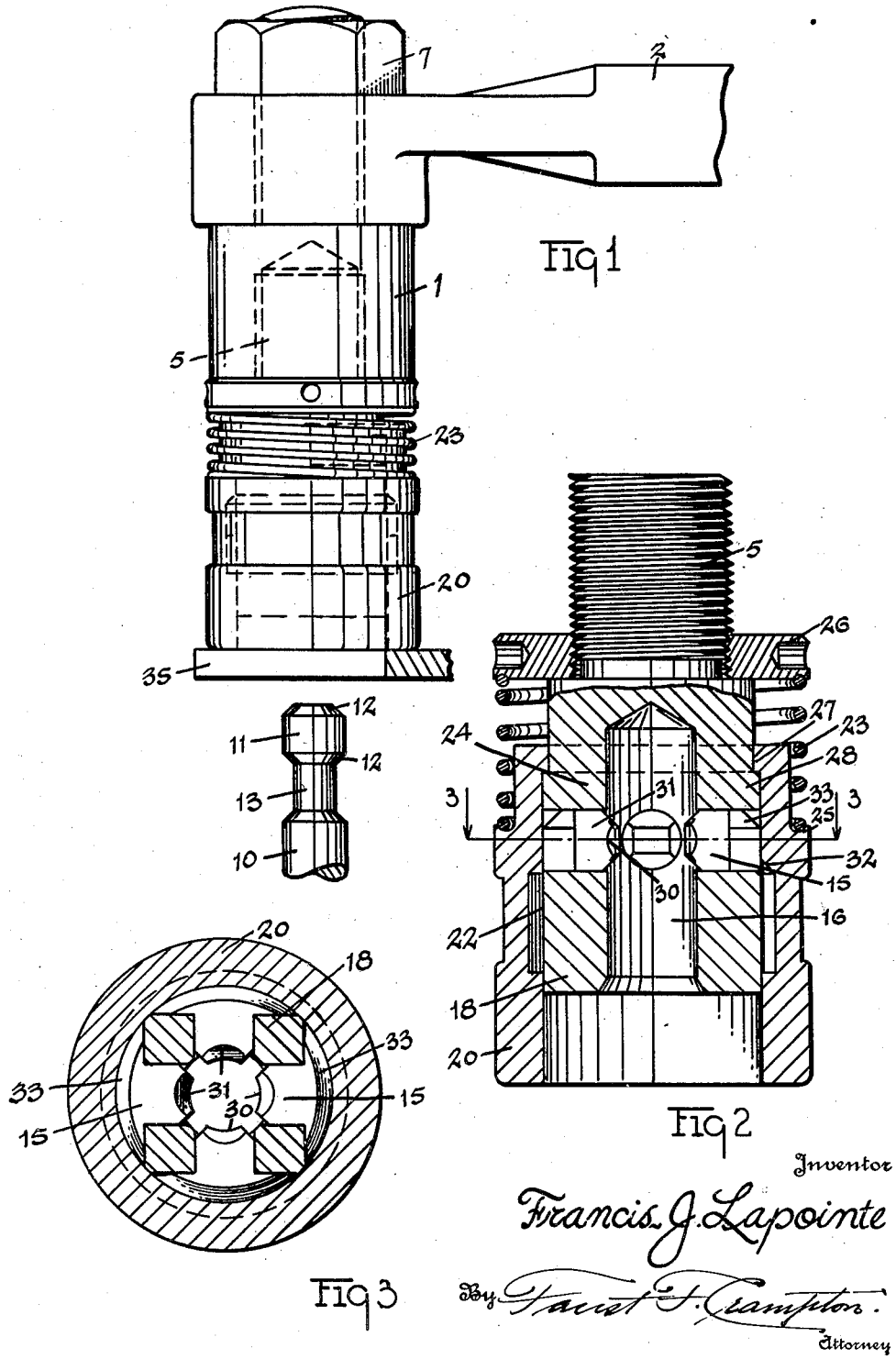
Inventor
Francis J. Lapointe
By Facit F. Crampton
Attorney Patented Jan. 14, 1936

2,027,486

UNITED STATES PATENT OFFICE 2,027,486

CLUTCH

Francis J. Lapointe, Ann Arbor, Mich.

Original application February 21, 1931, Serial No. 517,386, now Patent No. 1,937,121, dated November 28, 1933. Divided and this application November 25, 1933, Serial No. 699,737

1 Claim. (Cl. 279—74)

The object of my invention is to provide a tool clutch for securing a tool in a machine in such a manner as to enable ready or automatic clutching of the tool and ready or automatic declutching or disconnection. The invention may be used in a machine of a variety of forms and for many purposes. It may be used for example, in broaching machines wherein the clutch may be used as a part of the drawhead or press head, depending on whether the broach used is a pull broach or a push broach. In either case automatic means for disengaging the head of a broaching tool from the operative head of the machine may be provided, as, for example, to permit the broaching tool to be deposited in a socket upon completion of its working stroke and separate the broach from the drawhead or the work plate so that the material to be worked on may be inserted between the broaching tool and the operative head of the machine or its work plate.

The clutch of my invention automatically engages the tool when a part thereof is inserted in the clutch, and automatically releases the tool when a definite pressure is applied to a part of the clutch by some external means.

In a pull broaching machine, the drawhead or clutch embodying my invention provides means for rigidly engaging the head of the broach and is so constructed that the head of the broach will not be released from the drawhead until an external pressure is applied to a part of the drawhead, notwithstanding the strain and shearing action on the broaching tool by the work during the cutting or working stroke, thereby increasing the efficiency of the broaching machine, as disclosed in application Serial No. 517,386, filed February 21, 1931, now Patent No. 1,937,121, issued November 28, 1933, of which this is a divisional application.

The invention consists in other features and advantages which will appear from the following description and upon examination of the drawing. The structure containing the invention may partake of different forms and still embody the invention. To illustrate a practical application of the clutch of my invention, I have selected a drawhead of the type commonly used in broaching machines as an example of the various structures and details thereof that contain the invention, it being understood that variations may be made without departing from the spirit of the invention. The particular clutch referred to is shown in the accompanying drawing and is described hereinafter.

Fig. 1 is a perspective view of a drawhead of a broaching machine and the end of a broaching tool. Fig. 2 is a sectional view of the drawhead. Fig. 3 is a cross-section taken on the plane of the line 3—3 shown in Fig. 2.

The drawhead 1 is adapted to be positioned on a bracket 2 that may be connected to, or form a part of, a drawplate of a broaching machine. One end of the drawhead 1 has a threaded stem 5. The stem 5 is threaded into the bracket 2 and secured thereto by a nut 7. The drawhead may thus be reciprocated by the reciprocation of the plate during the operation of the broaching machine.

A broaching tool 10 is provided with a head 11 having sloping or bevelled edges 12 and a neck 13 which has a smaller diameter than the head 11 and is adapted to be engaged by a plurality of slideable dogs 15 positioned in the drawhead 1. The slideable dogs 15 are movable radially with respect to the axis of the drawhead and are so formed as to extend into the socket 16 of the drawhead to engage the neck 13 of the broaching tool 10 and lock the head 11 of the broach in the socket 16. The dogs 15 are located in openings formed in the wall 18, produced by the formation of the socket 16 in the drawhead, and are engaged by a shell 20 that surrounds the drawhead 1. Due to the construction of the broach head, the broach will be rigidly maintained in the socket by the dogs, notwithstanding vibrations of the machine and the tension stress on the broach during the cutting stroke.

In order that the head of the broaching tool 10 may be released from the socket 16, the shell 20 is provided with a recessed portion 22 which, when placed in registering relation to the dogs, enables the outward movement of the dogs 15 with respect to the head 11 of the broach by the lateral pressure produced by the inclined surfaces of the bevelled edges 12 of the head 11. The broach is thus released, when the recessed portion 22 is aligned with the dogs 15, by movement of the dogs with respect to the recessed portion.

The shell 20 is spring pressed by a helical spring 23 which is located intermediate a shoulder 25 formed on the shell 20 and a washer 26 threaded onto the stem 5 of the drawhead. The downward movement of the shell 20 by the pressure of the spring 23, is limited by abutting shoulders 27 and 28 formed on the shell 20 and the drawhead 1, respectively. The shell 20 is preferably of a length such that its lower edge will be located below the lower end of the drawhead 1 when the shell has been moved relative to the drawhead by the spring 23 to cause abutment of the shoulders 27 and 28.

The recessed portion 22 of the shell 20 has an inclined surface 32. Each of the dogs 15 is provided with a similarly inclined surface 33. When the dogs 15 are moved radially, the inclined surfaces 32 and 33 of the recessed portion 22 and the dogs 15, respectively, are slideably engaged. The recessed portion 22 of the shell 20 is so located that when the shell 20 is depressed by the operation of the spring 23, the dogs will be forced from the recess 22 to engage the head 11 of the broaching tool 10, the outward movement of the dogs from the recessed portion being facilitated by the slideable relationship of the inclined surfaces 32 and 33 of the recessed portion and the dogs. The dogs 15 will be engaged as against outward movement with respect to the broach head by a portion 24 of the shell 20 which has a diameter substantially less than that of the inner surface of the recessed portion 22, and the diameter of the portion 24 of the shell is such as to cause the ends 30 of the dogs 15 to protrude into the socket 16 to engage the head 11 of the broaching tool and lock the head of the broach in the socket of the drawhead.

In order to facilitate the insertion of the broach head into the socket and the engagement of the head by the dogs, and to facilitate the disengagement of the broach head from the dogs, the ends 30 of the dogs 15 are provided with upper and lower bevelled edges 31. Due to the slideable inter-relation of the bevelled surfaces 12 and 31 of the head 11 and the ends 30 of the dogs 15, respectively, an outward pressure will be exerted on the dogs by the head of the broaching tool during its insertion or its weight during its withdrawal from the socket of the drawhead.

Due to the diameter of the shell and presence of the recessed portion 22 in the inner wall of the shell, the movement of the dogs 15 outwardly with respect to the head of the broaching tool will be permitted or resisted, depending upon the relative location of the shell 20 with respect to the drawhead 1. If the shell is so located with respect to the drawhead that the recessed portion 22 is located in a position to receive the dogs 15, the dogs may be moved outwardly with respect to the broach head to release the broaching tool when there is a downward pull resulting either from the weight of the tool itself or a definite external pull. If the shell is so located with respect to the drawhead that the recessed portion 22 is in a position to receive the dogs 15 and it is desired to insert the broaching tool in the socket 16, the dogs are moved radially with respect to the axis of the broach when the broach head is inserted in the drawhead, which permits the broach to seat itself in the socket, the radial movement of the dogs with respect to the axis of the broach being readily achieved by reason of the slideable inter-relation of the bevelled surfaces 31 of the ends 30 of the dogs. Subsequent downward movement of the shell 20 by reason of the pressure of the spring 23 will move the recessed portion 22 longitudinally with respect to the drawhead and will force the dogs 15 inwardly to engage the neck 13 of the broach 10 and secure the head of the broaching tool within the socket. The head of the broach will thus be rigidly engaged in the socket of the drawhead until the shell 20 is so moved longitudinally with respect to the drawhead 1 as to align the recessed portion 22 with the dogs, so that the dogs 15 may be moved outwardly with respect to the broach head and release the broach from the drawhead.

The drawhead may be so positioned and assembled with respect to other parts of the broaching machine that when the drawhead is moved downwardly, the lower edge of the shell 20 may be engaged by a member such as the plate or bracket 35, or other suitable means, which will operate to prevent further movement of the shell 20 while the broach head 1 moves downwardly with respect to the shell. The prevention of movement of the shell during the downward movement of the drawhead positions the recessed portion of the shell so that it is located in alignment with the dogs 15 and so that the weight of the broach or a downward pressure externally applied to the broach will move the dogs radially with respect to the axis of the broach into the recessed portion 22 of the shell 20, due to the slideable inter-relation of the bevelled surfaces 12 of the head of the broach and the surfaces 31 of the ends 30 of the dogs and the slideable inter-relation of the inclined surfaces 33 of the dogs and the inclined surfaces 32 of the recessed portion.

The broach, when released from the drawhead, may be guided into a suitable socket or recessed portion, and the work may be positioned on a work plate between the broach head and the drawhead. The broaching tool may then be lifted and inserted into the drawhead by suitable means, the said means lifting the broach upwardly into the socket 16 of the drawhead. In the event that the dogs 15 have been worked into the socket by machine vibration or otherwise, the upward movement of the broach head will force the dogs outwardly with respect to the drawhead and into the recessed portion 22 of the shell 20, and the said means will operate to maintain the broach head in its position within the socket until the upward stroke of the drawhead has moved the shell 20 so that its lower edges are no longer engaged by the deflector plate 35. The spring 23 then forces the shell downwardly with respect to the drawhead as the drawhead is raised until the shoulders 27 and 28 of the shell and drawhead are in abutting relation. The relative downward movement of the shell with respect to the drawhead forces the dogs 15 from the recessed portion 22 and forces the ends 30 of the dogs 15 into the socket 16 to engage the neck 13 of the broaching tool 10 and thus locate the broach in the drawhead. Continued upward movement of the drawhead causes the broach to complete its cutting or working stroke.

I claim:

In a clutch for a tool having a neck, a shank and a head, the head having oppositely disposed angular beveled surfaces, a cylindrical clutch block having a socket for receiving the head of a tool, the head having beveled surfaces, a cylindrical clutch block having a socket for receiving the head and a part of the shank of the tool, the clutch block having openings, radially slidable dogs located in the openings, a shell adapted for telescopic movements relative to the clutch block and having two cylindrical guiding surfaces at its ends fitting the exterior cylindrical surface of the clutch block and an inwardly extending flange, the edge of the flange fitting the cylindrical surface of the clutch block and forming an auxiliary guiding surface, the clutch block having a circular shoulder at its upper end and engaged by the said flange and fitting the interior surface of the shell, the lower end of the shell extending below the clutch block, the clutch block having a circular protruding part and the shell having a protruding shoulder, a helical spring located between the said part and the said protruding shoulder for yieldingly resisting movement of the shell relative to the clutch block, the shell having a circular recess for receiving the outer ends of the dogs to release the tool when the shell is moved counter the pressure of the spring.

FRANCIS J. LAPOINTE.